United States Patent [19]

Fukuchi et al.

[11] Patent Number: 5,336,535
[45] Date of Patent: Aug. 9, 1994

[54] PLASTIC LIQUID CRYSTAL DISPLAY DEVICE

[75] Inventors: Shunsei Fukuchi; Kyouhei Isohata, both of Nara; Makoto Iwamoto, Yamato Koriyama; Kenji Misono, Nara; Hiroshi Takanashi, Souraku, all of Japan

[73] Assignee: Sharp Kabushiki Kaisha, Osaka, Japan

[21] Appl. No.: 980,209

[22] Filed: Nov. 23, 1992

[30] Foreign Application Priority Data

Nov. 27, 1991 [JP] Japan ................................ 3-097534[U]

[51] Int. Cl.$^5$ ...................... G02F 1/133; G02F 1/1337
[52] U.S. Cl. ............................................. 428/1; 359/79
[58] Field of Search ............................. 428/1; 359/79

[56] References Cited

FOREIGN PATENT DOCUMENTS 56-52722  5/1981  Japan .
60-66232  4/1985  Japan .
61-47931  3/1986  Japan .

*Primary Examiner*—Alexander S. Thomas

[57] ABSTRACT

A plastic liquid crystal display device having top coats (insulating films) which can be set at 200° C. or less without resort to ultraviolet light and have appreciable flexibility. The plastic liquid crystal display device comprises a pair of plastic substrates, transparent electrodes, insulating films for protecting the transparent electrodes, aligning films and a liquid crystal, wherein the insulating film (top coat) is formed by dispersing any one of acryl-silanic resin, epoxy-silanic resin and silanic resin in a solvent to provide a solution, coating the solution on the transparent electrode and sintering a resulting coating at 200° C. or less.

12 Claims, 2 Drawing Sheets

PLASTIC LIQUID CRYSTAL DISPLAY DEVICE

BACKGROUND OF THE INVENTION

1. Field of the Invention

The present invention relates to a liquid crystal display device using plastic substrates which is principally used as a display device for Office Automatic (OA) appliances such as a note type personal computer, a word processor, and a palm-top type personal computer.

2. Description of the Related Art

A typical liquid crystal display device is comprised of a pair of plastic substrates, transparent electrodes, insulating films for protecting the electrodes, aligning or orientation films and a liquid crystal.

The insulating film (top coat) is applied by overcoat processing and takes the form of a thin protective layer of Si oxide or Ti oxide on the surface of the electrode formed on the substrate.

Most of these type of liquid crystal display devices are manufactured, as shown in FIG. 1, by preparing two glass substrates 11, providing on the inner surface of each glass substrate 11 a lower protective film ($SiO_2$ film) 12, an ITO (indium oxide added with tin) electrode 13, an insulating film 14 and an aligning film (polyimide film) 15, opposing the two glass substrates to each other and filling a gap therebetween (cell gap) with a liquid crystal 17. Denoted by 10 is a polarizer plate and by 16 is a seal agent. The lower protective film 12 prevents impurities (Na and the like) in the glass substrate 11 from migrating into the liquid crystal 17. On the other hand, when conductive foreign matters having a size comparable to the cell gap mix in the liquid crystal layer 17, the insulating film (top coat) 14 protects the ITO electrode 13 electrically and mechanically to prevent faulty leakage.

In the past, solution for formation of the insulating film 14 is prepared by dissolving a prepolymer (or monomer) of Si (or Si and Ti) added with hydroxyl group—OH or alkoxy group—OR in a solvent of high boiling point such as normal methyl pyrrolidone or dimethyl acetamide at a percentage of 3 to 10 wt % of solid components. The solution will hereinafter be called "silica coating ink" or simply referred to as "ink" and is commercially available as, for example, a MOS,Si film, or Ti—Si film manufactured by Tokyo Ohka Kogyo (Japanese corporation). Thus, the insulating film is formed by printing the silica coating ink on the ITO electrode 13 by offset printing technique and thereafter sintering the print at a temperature of 250° to 350° C. More particularly, the silica coating ink is subjected to dehydration condensation to create —Si—O—Si— or —Ti—O—Ti— (for example, through a reaction from silanol to siloxane) to form an oxide of the ink. Through this, the insulating film 14 is provided with insulating capability and hardness necessary for the insulating film to function as a so-called top coat.

To effect the dehydration condensation reaction completely, a temperature of 500° C. is needed but for the insulating film (top coat) 14 of the liquid crystal display device, a sintering temperature of 250° C. is sufficient.

Further, in order to reduce the size and thickness of the liquid crystal display device and to increase its impact-proof capability, it is desirable to use plastic film substrates (made of, for example, polyether sulfone (PES), polyethylene terephthalate (PET), aryl diglycol carbonate (ADC) or acrylic resin in place of the glass substrates 11. In this case, thermal stability of the plastic film substrate is ensured at 200° C. or less and correspondingly the aforementioned sintering temperature must be limited to 200° C. or less. However, by simply setting the sintering temperature to 200° C. or less, the aforementioned dehydration condensation reaction does not proceed satisfactorily, leaving behind the hydroxyl group—OH alkoxy group—OR and a solvent in the top coat 14. As a result, there arises a problem that the insulating capability and hardness for protecting the ITO electrode 13 cannot be ensured.

To cope with this problem, the present applicant has already proposed Japanese Patent Application No. Hei 3-71476, according to which in order to provide a liquid crystal display device having an upper insulating film capable of being formed at a sintering temperature of 200° C. or less without thermally changing the nature of a plastic film substrate and capable of having sufficient insulating capability and hardness for protecting an ITO electrode, a top coat is used which is formed through the steps of coating silica coating ink as a material of the top coat on the surface of the electrode formed on the substrate, irradiating ultraviolet light (UV light) on the silica coating ink, and sintering the silica coating ink having experienced the ultraviolet light irradiation at a sintering temperature of 200° C. or less.

Thus, conventionally, when etching and patterning the transparent electrode and depositing a silica coating material (for example, MOF Ti—Si film manufactured by Tokyo Ohka Kogyo (Japanese corporation))on the etched and patterned transparent electrode in a thickness of 700 to 1400 Å through print process to form an insulating layer having hardness and insulating capability, the above technique is applied by irradiating UV light on the coating material by means of a low pressure mercury vapor lamp to volatilize a solvent in the coating material, with a view of permitting low temperature sintering at about 200° C.

The problem resides in the fact that the silica coating film should be sintered at 250° C. or more to have necessary hardness and insulation for the top coat (insulating film) but at that temperature the thermal stability of the plastic substrate is degraded. Therefore, in effect, the heating temperature is set to about 200° C. allowable for the thermal stability and a solvent in the coating material is volatilized under the irradiation of UV light by a low pressure mercury vapor lamp to form a topcoat film (insulating film).

However, the UV light on the one hand can contribute to achievement of low temperature sintering of the top coat (insulating film) but on the other hand can destroy the plastic substrate, and besides a resulting silica coating film is so hard that it may crack disadvantageously when the plastic substrate deforms.

SUMMARY OF THE INVENTION

The present invention contemplates elimination of the conventional drawbacks and it is an object of the invention to provide a plastic liquid crystal display device having top coats (insulating films) which can be set 200° C. or less without resort to ultraviolet light (UV light) and can have appreciable flexibility.

According to the present invention, in a plastic liquid crystal display device comprising a pair of plastic substrates, transparent electrodes, insulating films for protecting the transparent electrodes, aligning films and a liquid crystal, the insulating film is an insulating film which is formed by dispersing any one of acryl-silanic resin, epoxy-silanic resin or silanic resin in a solvent to provide a solution, coating the solution on the transparent electrode and sintering a resulting coating at 200° C. or less.

The thus prepared coat film (insulating film) need not be sintered at a higher temperature than that for a simple substance of oxide of Si and/or Ti and does not damage the plastic substrate. Further, since the coat film (insulating film) is flexible, generation of cracks in the coat film due to deformation of the substrate can be reduced.

DESCRIPTION OF THE PREFERRED EMBODIMENTS

The invention will now be described with reference to the accompanying drawings and by referring to specific experimental results.

Figure 1:
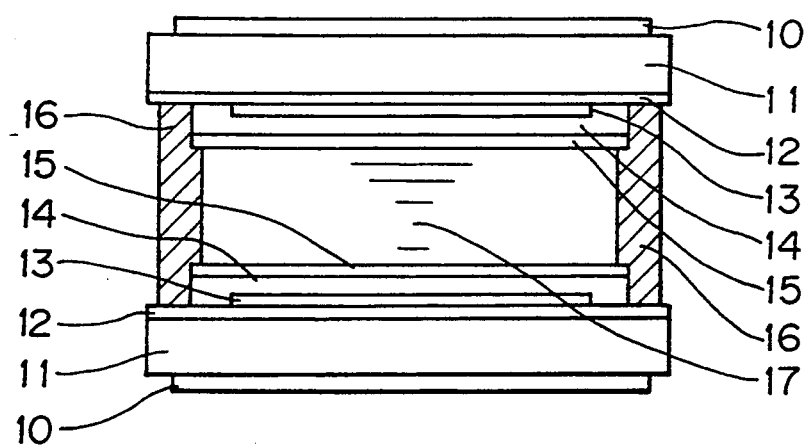
FIG. 1 is a sectional view showing a conventional liquid crystal display device using glass substrates.
Figure 2:
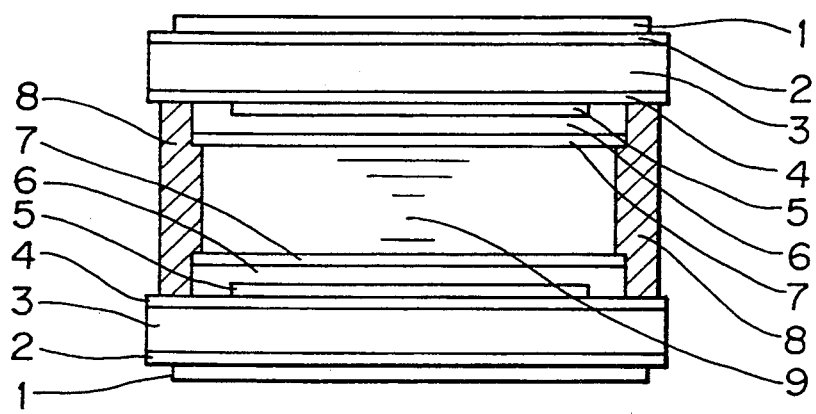
FIG. 2 is a sectional view showing a plastic film liquid crystal display device according to an embodiment of the invention.

Referring first to FIG. 2, there is illustrated, in schematic form, a typical example of a plastic liquid crystal display device according to the invention. In the figure, reference numeral 1 designates a polarizer plate, 2 and 4 hard coats, 3 a substrate, 5 a transparent electrode, 6 a top coat, 7 an aligning film, 8 a seal agent and 9 a liquid crystal.

The polarizer plate 1 is adapted to permit transmission of only light oscillating intensively in a specified direction. To describe a general method of making this polarizer plate 1, a thin film of PVA is extended under application of heat and the extended film is contacted to a solution called H ink containing a large amount of iodine so that this film may absorb iodine to form a film having polarization capability.

Each of the hard coats 2 and 4 acts as a UV cut filter and is typically made of cellulose acetate.

The substrate 3 is formed of a transparent plastic resin plate which is made of epoxy resin or acrylic resin.

For formation of the transparent electrode 5, the hard coat (such as NESA) film 4 and ITO film are vapor-deposited on the substrate 3 and the ITO film is patterned by, for example, photoetching or a laser beam to obtain an electrode configuration.

The top coat (insulating film) 6 is produced by overcoat processing and is provided on the surface of the substrate electrode to serve as a thin protective layer. The top coat is a coating of oxide of Ti or Si which is a film of a silica coating material (for example, MOF Ti—Si film manufactured by Tokyo Ohka Kogyo (Japanese corporation) deposited in 700 to 1400 Å thickness through, for example, printing process, the coating exhibiting hardness and insulating capability. More preferably, the top coat may be a coating of oxide of Ti or Si combined with acrylic resin, thus having flexibility in addition to hardness and insulating capability.

Accordingly, in the present invention, any one of acryl-silanic resin, epoxy-silanic resin and silanic resin is dispersed in a solvent and a resulting solution is coated and sintered at 200° C. or less to form an insulating film 6.

The acryl-silanic resin and epoxy-silanic resin herein referred to are respectively acrylic resin in which SiOx or a silanic compound is dispersed and epoxy resin in which SiOx or a silanic compound is dispersed, and preferably they may be used within a preferable use range in which they are dispersed in the solvent by a silane weight percent of 1 to 70. The silanic resin is naturally of a silanic compound as a whole and preferably it may be used within a preferable use range in which it is dispersed in the solvent by 1 to 70 weight percent.

If the content of the silane component is not greater than 1 weight percent, the film formation component runs short and a satisfactory insulating film cannot be formed. On the other hand, if the silane component exceeds 70 weight percent, solid matters in the ink material become superfluous, making it difficult to form a film of uniform thickness. Thus, more preferably, the resin component may be used within a use range in which it is dispersed in the solvent by a silane weight percentage of about 45 to 55.

The aligning film 7 is used to align the orientation of liquid crystal molecules on the plastic substrate in one direction and inorganic material such as silane coupling agent or SiOx or an organic material such as polyimide or PVA is known as the material of the aligning film. Of them, a polyimide material is rubbed in one direction and used as the aligning film in industry at present.

The seal agent 8 is thermally fused for sealing. Used as the material of the seal agent is an inorganic material such as glass or an organic material such as nylon, polyester, polyimide or thermosetting epoxy. Of them, thermosetting epoxy is preferably used.

Many kinds of liquid crystal such as nematic, cholesteric, and smectic liquid crystals have been proposed and a desired one of them may be used as the liquid crystal 9. One of typically used liquid crystals is of nonanoic acid cholesterol.

A method of manufacturing a plastic liquid crystal display device of this invention will now be described in detail by way of example. The manufacture method described herein is directed to a liquid crystal display device using a pair of plastic film substrates 3 and 3 as shown in FIG. 2.

Firstly, plastic substrates 3 each having at both surfaces hard coats (wear-proof coatings) 2 and 4 made of acrylic resin or silicone resin. The plastic substrate 3 is formed at one surface (provided with the hard coat 4) with an ITO electrode 5 made of indium oxide added with tin. Subsequently, a top coat film (insulating film) 6 is formed on the surface of the ITO electrode 5 by dispersing a material of the insulating film 6 in which SiOx is dispersed in acrylic resin (PCF-080 manufactured by Tokyo Ohka Kogyo (Japanese corporation)) in a solvent by a silane weight percentage of 50 to provide dispersed coating material ink, coating the resulting dispersed coating material ink on the electrode surface through offset print and sintering the ink at 150° to 200° C. for about one hour. In this case, volatilization of the solvent in the coating material under the irradiation of UV light by means of a low pressure mercury vapor lamp is not carried out.

In this manner, the insulating film (top coat) 6 having sufficient insulation and hardness to protect the ITO electrode 5 can be formed without thermally changing the nature of the plastic film substrate 3. Thereafter, an aligning film 7 is formed on the surface of the insulating film 6. A pair of thus prepared substrates 3 and 3 are arranged to oppose to each other, a liquid crystal 9 is filled while sealing the substrates by a seal agent 8 and polarizer plates 1 are attached, thus completing the manufacture procedure.

Through the above procedure, the insulating film 6 can be formed without volatilizing the solvent in the coating material under the UV light irradiation by means of a low pressure mercury vapor lamp.

In other words, the coating material can be set at 200° C. or less without resort to UV light to form a coating film having appreciable flexibility.

Next, a comparative example of a top coat (insulating film) was prepared by a conventioned method. More specifically, a silica coating material(MOF Ti—Si film manufactured by Tokyo Ohka Kogyo (Japanese corporation)) was deposited in a thickness of 700 to 1400 Å through print process and sintered at about 200° C. and thereafter a solvent in the coating material was volatilized under the irradiation of UV light by means of a low pressure mercury vapor lamp to form a top coat film (insulating film).

Figure 3:
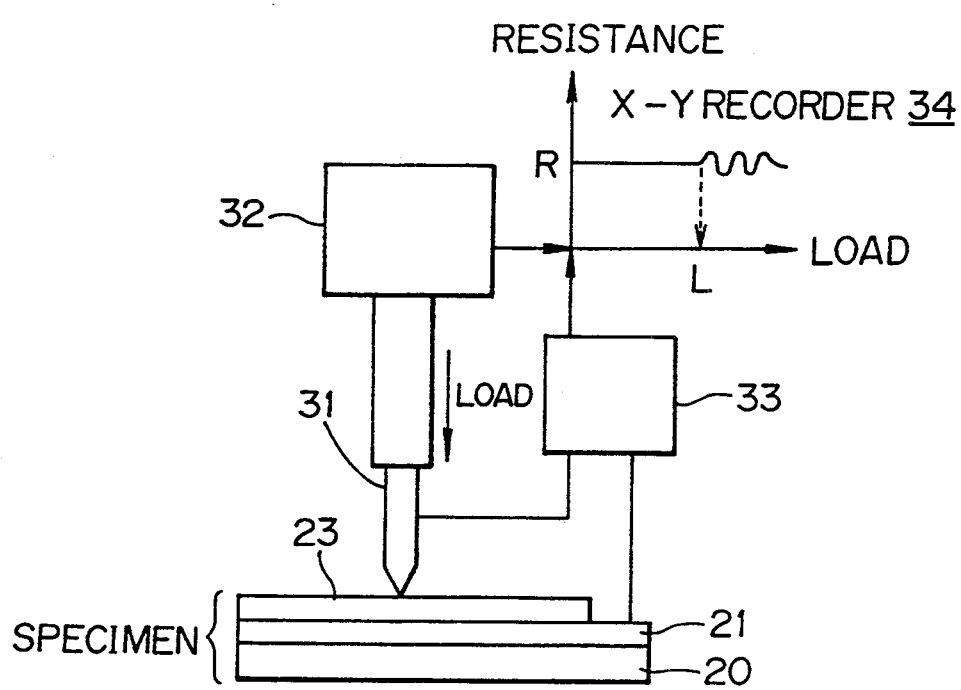
FIG. 3 is a diagram showing a measuring system for evaluating hardness of an insulating film.

For the purpose of evaluating the hardness of the insulating film 6, a specimen having as shown in FIG. 3 a glass substrate 20, an ITO electrode 21 formed thereon and an insulating film 23 formed thereon without resort to the irradiation of UV light in accordance with teachings of the present invention was prepared. Then, while a load was applied on the insulating film 23 by means of a needle-like load transmitter 31 of an autograph loading device 32, an electrical resistance R between the load transmitter 31 and the ITO electrode 21 was measured by means of a digital voltmeter 33. An XY recorder 34 was set such that load is indicated on an X axis and electrical resistance is indicated on the Y axis. As the load increased, the insulating film 23 was broken through and the electrical resistance R was changed at a point L (leak point) which was detected. Results of this measurement demonstrated that the insulating film 6 according to the invention had hardness comparable to that of the control top coat (sintered at about 200° C. and subjected to the UV light irradiation).

Also, results of creeping measurement of a top coat formed on an ITO electrode pattern having a pattern distance of 50 μm have proved that the top coat has insulating capability comparable to that of the prior art top coat.

As described above, the top coat used in the present invention can be set at 200° C. or less without resort to UV light and can have flexibility, thus eliminating the problems of breakage of the plastic substrate and occurrence of cracks in the top coat due to deformation of the plastic substrate.

As is clear from the foregoing, according to the present invention, the insulating film having sufficient insulation capability and hardness to protect the ITO electrode can be formed and therefore when the plastic film substrate is used as the transparent substrate, a liquid crystal display device can be manufactured without thermally changing the nature of the plastic film substrate.

What is claimed is:

1. A plastic liquid crystal display device comprising:
a pair of plastic substrates, located on either side of a pair of transparent electrodes, and
a pair of insulating films for protecting said pair of transparent electrodes, wherein said pair of insulating films are formed by dispersing any one of acrylic-silanic resin, epoxy-silanic resin, and silanic resin in a solvent to produce a solution, coating the solution on said pair of transparent electrodes and sintering a resulting coating at 200° C. or less.

2. The plastic liquid crystal display device of claim 1, wherein a silane weight percentage of said any one of acrylic-silanic resin, epoxy-silanic resin, and silanic resin is within a range of 1 to 70 percent.

3. The plastic liquid display device of claim 2, wherein a silane weight percentage of said any one of acrylic-silanic resin, epoxy-silanic resin, and silanic resin is within a range of 45 to 55 percent.

4. A plastic liquid crystal display device comprising:
a pair of plastic substrates, located on either side of a pair of transparent electrodes, and
a pair of insulating films for protecting said pair of transparent electrodes, wherein said pair of insulating films are formed by dispersing any one of acrylic-silanic resin, epoxy-silanic resin, and silanic resin in a solvent to produce a solution, coating the solution on said pair of transparent electrodes and sintering a resulting coating at 200° C. or less, said acryl-silanic resin or said epoxy-silanic resin being prepared by dispersing a silicon oxide or a silanic compound in acrylic resin or epoxy resin.

5. The plastic liquid crystal display device of claim 4, wherein a silane weight percentage of said any one of acrylic-silanic resin, epoxy-silanic resin, and silanic resin is within a range of 1 to 70 percent.

6. The plastic liquid display device of claim 5, wherein a silane weight percentage of said any one of acrylic-silanic resin, epoxy-silanic resin, and silanic resin is within a range of 45 to 55 percent.

7. A plastic liquid crystal display device comprising:
a pair of plastic substrates opposing each other;
a pair of multi-layers, each including a lower protective film, a transparent electrode, and an insulating film, formed between said pair of plastic substrates; and
a liquid crystal between said pair of multi-layers;
wherein each insulating film is formed by dispersing any one of acrylic-silanic resin, epoxy-silanic resin, and silanic resin in a solvent to produce a solution, coating the solution on said pair of transparent electrodes and sintering a resulting coating at 200° C. or less.

8. The plastic liquid crystal display device of claim 7, wherein a silane weight percentage of said any one of acrylic-silane resin, epoxy-silanic resin, and silanic resin is within a range of 1 to 70 percent.

9. The plastic liquid display device of claim 8, wherein a silane weight percentage of said any one of acrylic-silanic resin, epoxy-silanic resin, and silanic resin is within a range of 45 to 55 percent.

10. A plastic liquid crystal display device comprising:
a pair of plastic substrates opposing each other;
a pair of multi-layers, each including a lower protective film, a transparent electrode, and an insulating film, formed between said pair of plastic substrates; and
a liquid crystal between said pair of multi-layers;
wherein each insulating film is formed by dispersing any one of acrylic-silanic resin, epoxy-silanic resin, and silanic resin in a solvent to produce a solution, coating the solution on said pair of transparent electrodes and sintering a resulting coating at 200° C. or less, said acryl-silanic resin or said epoxy-silanic resin being prepared by dispersing a silicon oxide or a silanic compound in acrylic resin or epoxy resin.

11. The plastic liquid crystal display device of claim 10, wherein a silane weight percentage of said any one of acrylic-silanic resin, epoxy-silanic resin, and silanic resin is within a range of 1 to 70 percent.

12. The plastic liquid display device of claim 11, wherein a silane weight percentage of said any one of acrylic-silanic resin, epoxy-silanic resin, and silanic is within a range of 45 to 55 percent.

* * * * *